June 4, 1940.    B. R. GRANBERG    2,203,297
CONTROL MECHANISM
Filed May 4, 1937    6 Sheets-Sheet 1

Inventor:
Bengt R. Granberg
By
his Attys.

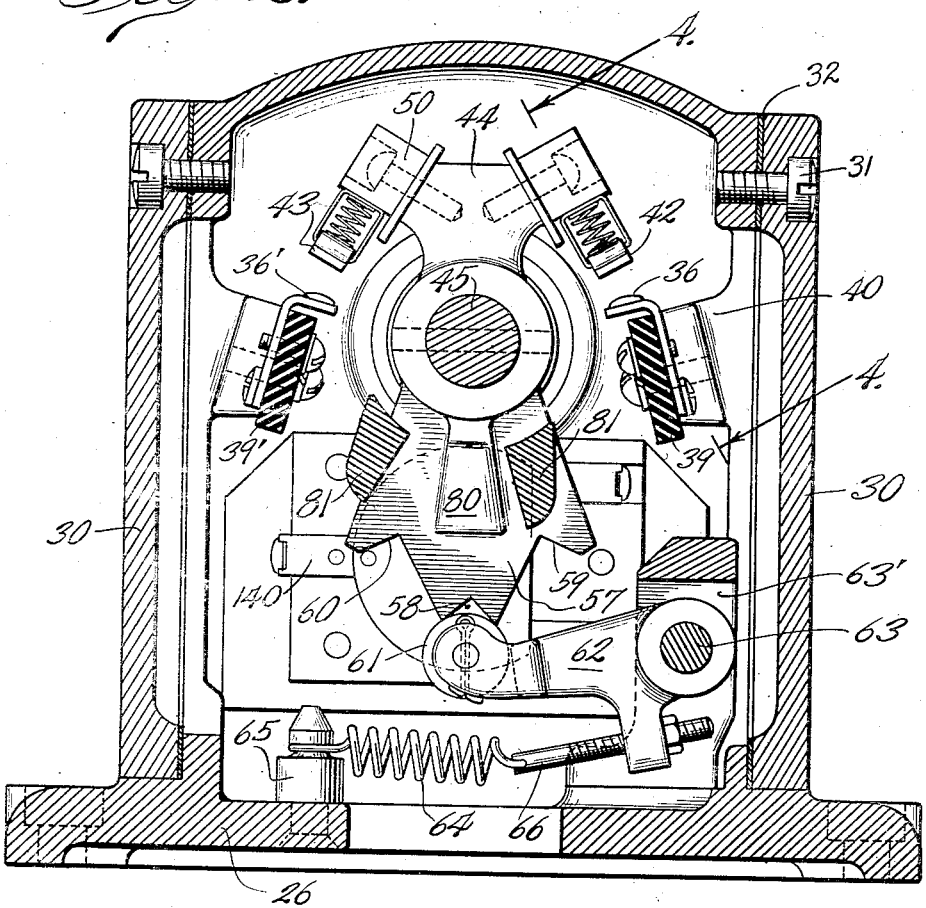
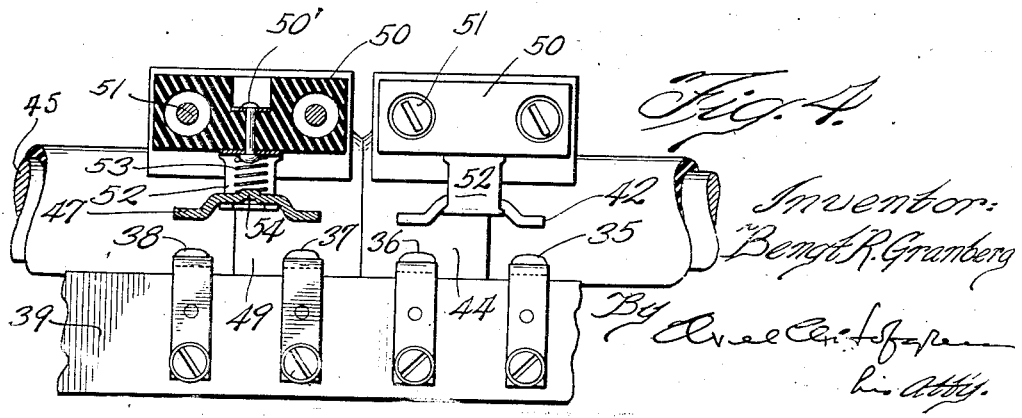

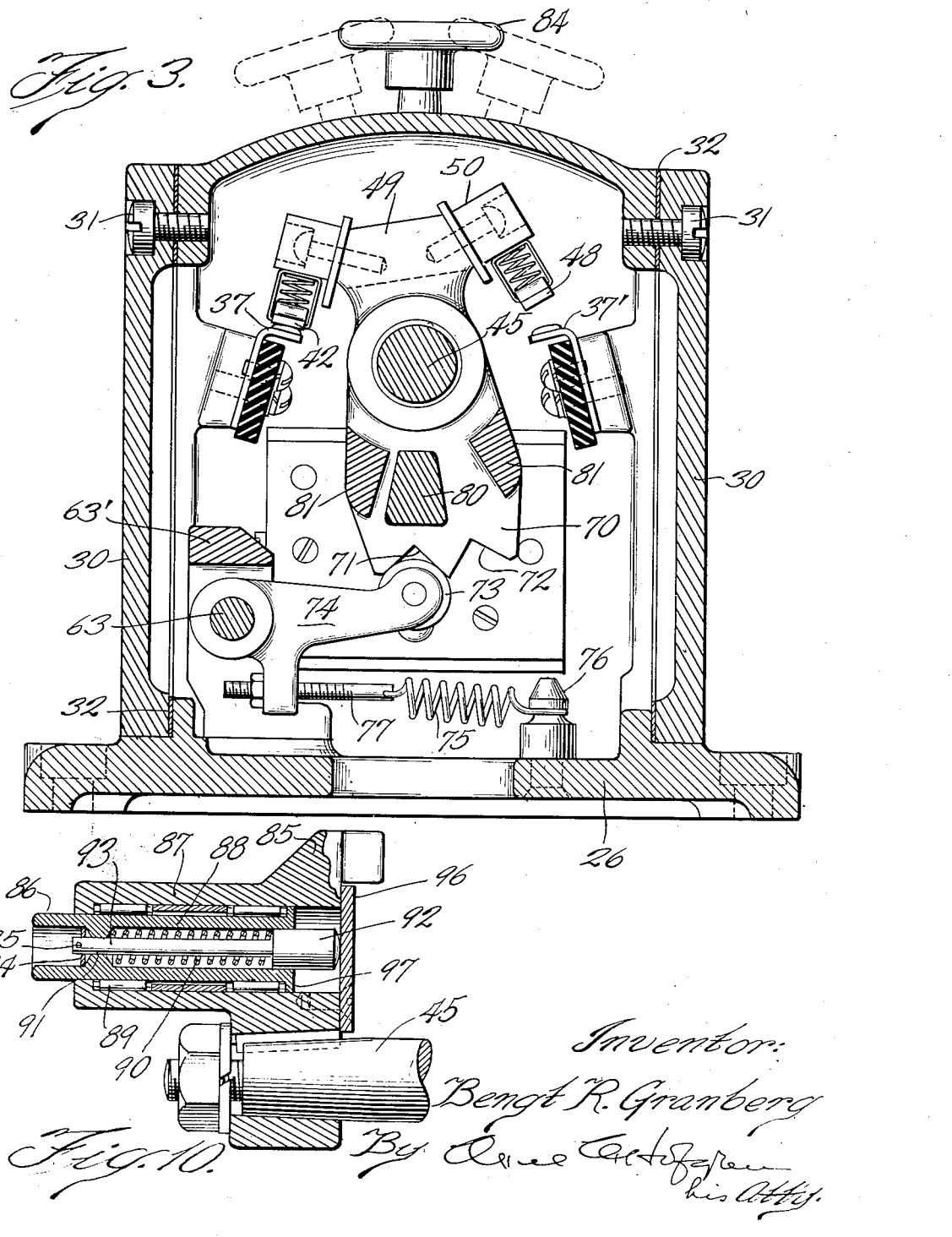

June 4, 1940.  B. R. GRANBERG  2,203,297
CONTROL MECHANISM
Filed May 4, 1937  6 Sheets-Sheet 4
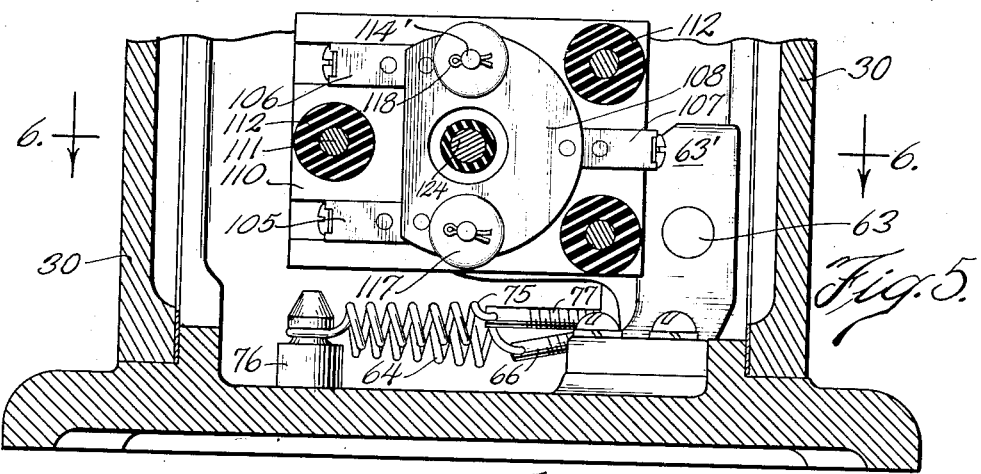
Fig. 5.
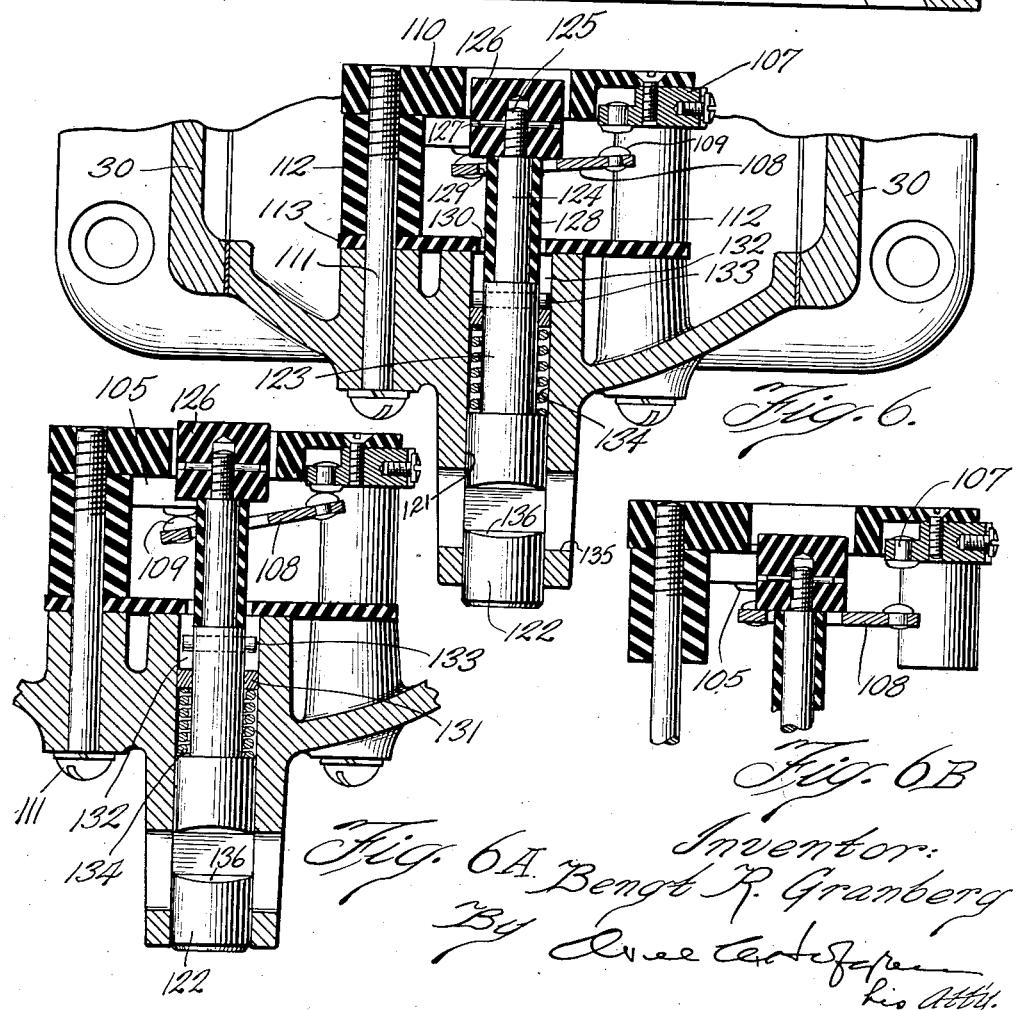
Fig. 6.
Fig. 6A.  Fig. 6B
Inventor:
Bengt R. Granberg
By his Atty.

June 4, 1940.  B. R. GRANBERG  2,203,297
CONTROL MECHANISM
Filed May 4, 1937    6 Sheets-Sheet 5
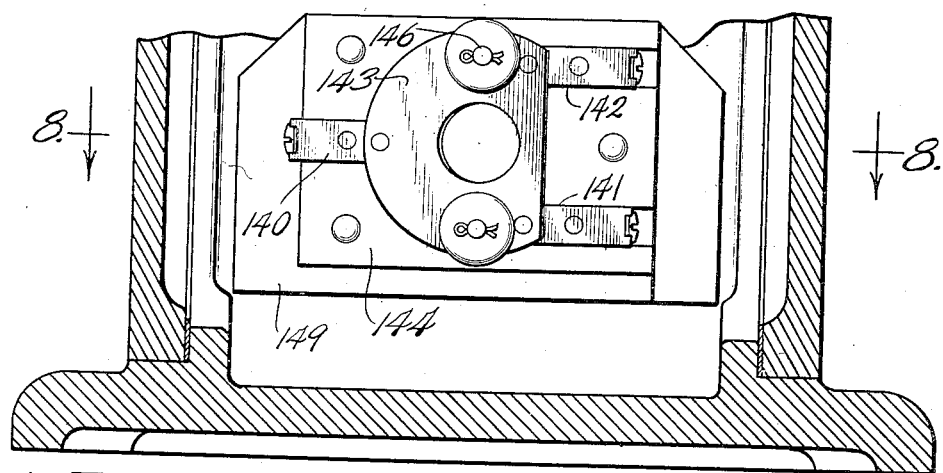
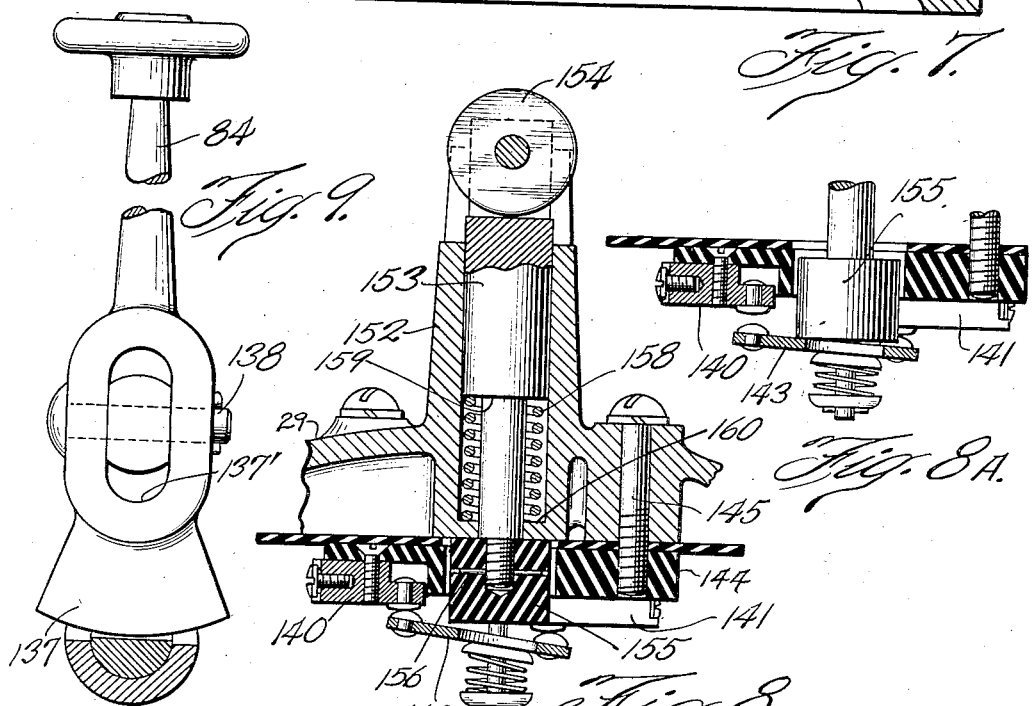
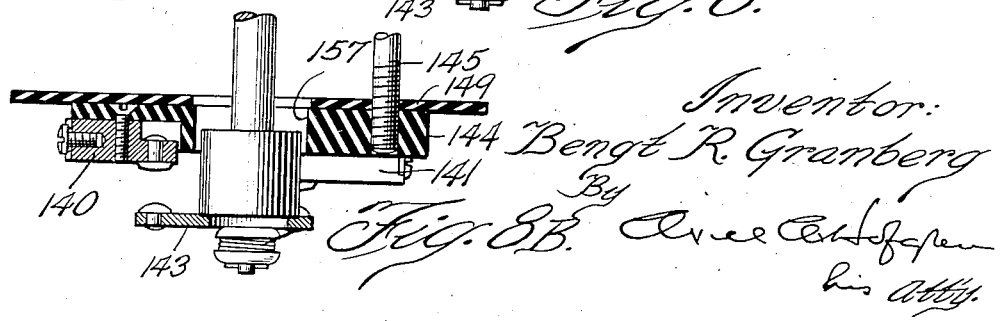
Inventor:
Bengt R. Granberg
By his Atty.

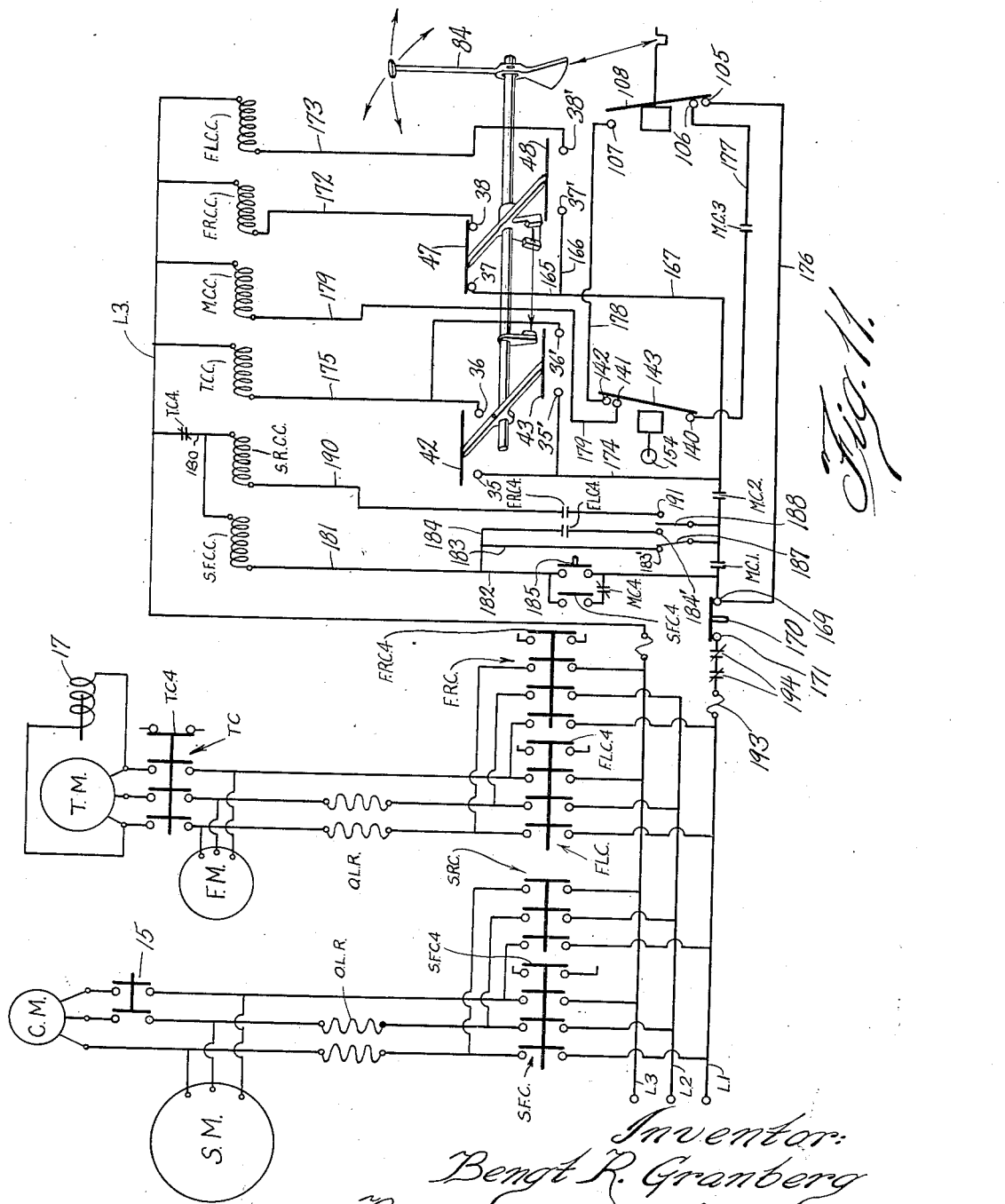

Patented June 4, 1940

2,203,297

UNITED STATES PATENT OFFICE 2,203,297

CONTROL MECHANISM

Bengt R. Granberg, Rockford, Ill., assignor to Sundstrand Machine Tool Co., Rockford, Ill., a corporation of Illinois Application May 4, 1937, Serial No. 140,734

5 Claims. (Cl. 200—4)

The invention relates generally to electrical control mechanism and particularly to electrical control mechanism for machine tools.

A general object of the invention is to provide a new and improved control mechanism affording great flexibility of control with unusual ease and simplicity of operation.

A more particular object is to provide an electrical control mechanism including a unitary controller which governs the major portion of the control functions of the mechanism.

Another object is to perfect an electrical control mechanism for machine tools including a controller having a first control means capable of both manual and automatic actuation for controlling rate and direction of movement of an element of the machine tool, and a second independent control means capable of manual actuation for controlling starting and stopping of the machine tool.

Yet another object is to provide an electrical control mechanism for machine tools including a unitary controller having a first control means for governing rate and direction of movement of an element of the machine tool, and a second independent control means for governing starting and stopping of the machine tool, the second control means being operable independently of the first control means and regardless of and without requiring change in the position of the first control means.

Still another object is to provide an electrical control mechanism for machine tools including a unitary controller having a first control means governing rate and direction of movement of an element of the machine tool, a second independent control means for governing starting and stopping of the machine tool, and a single manual means for actuating both control means independently of one another by different movements and regardless of the position of either control means.

A further object is to perfect an electrical control mechanism for machine tools including a unitary controller having a first means capable of both manual and automatic operation governing rate and direction of movement of an element on the machine tool, a second means for governing starting and stopping of the machine tool and capable of manual actuation independently of the first means, and a third means adapted for automatic actuation and operable to arrest the machine tool should the element travel beyond its predetermined limits.

A further object of the invention is to provide a new and improved unitary electric controller which is capable of both manual and automatic operation and which is of compact and economical construction yet provides a plurality of switches actuable in a variety of ways to afford an unusually flexible control.

Yet a further object is to provide a unitary controller having a first control means actuated by oscillation thereof, a second control means actuated by linear movement, and a single control handle for independent manual actuation of either of the means.

Other objects and advantages will become apparent from the following detailed description taken in connection with the accompanying drawings, in which:

Fig. 2 is a transverse vertical sectional view taken in the direction of the arrows along line 2—2 of Fig. 1.

Fig. 3 is a transverse vertical sectional view similar to Fig. 2 but looking in the opposite direction along line 3—3 of Fig. 1.

Fig. 4 is a fragmentary view partially in section and partially in elevation, taken approximately along line 4—4 of Fig. 2.

Fig. 5 is a detail view of the manually actuated start and stop control means taken along line 5—5 of Fig. 1.

Fig. 6 is a horizontal sectional view of the control means shown in Fig. 5, taken along line 6—6 of Fig. 5 and showing the control means in its normal position.

Fig. 6A is a fragmentary view similar to Fig. 6, but showing the control means in a position on one side of neutral in which all of the switches are closed.

Fig. 6B is a fragmentary view similar to Fig. 6, but showing the control means on another side of neutral in which all of the switches are open.

Fig. 7 is a view taken along line 7—7 of Fig. 1 showing the limit control means.

Fig. 8 is a fragmentary horizontal sectional view taken along line 8—8 of Fig. 7 and showing the control means in its normal position.

Fig. 8A is a fragmentary view similar to Fig. 8, but showing the control means in a first shifted position.

Fig. 8B is a fragmentary view similar to Fig. 8, but showing the switch means in a second shifted position.

Fig. 9 is an end elevational view showing the mounting of the controller handle.

Fig. 10 is a sectional view showing the details of the dog actuated follower for the controller.

Fig. 11 is a circuit diagram showing the controller connected in the control circuit of a machine tool or the like.

Figure 1:
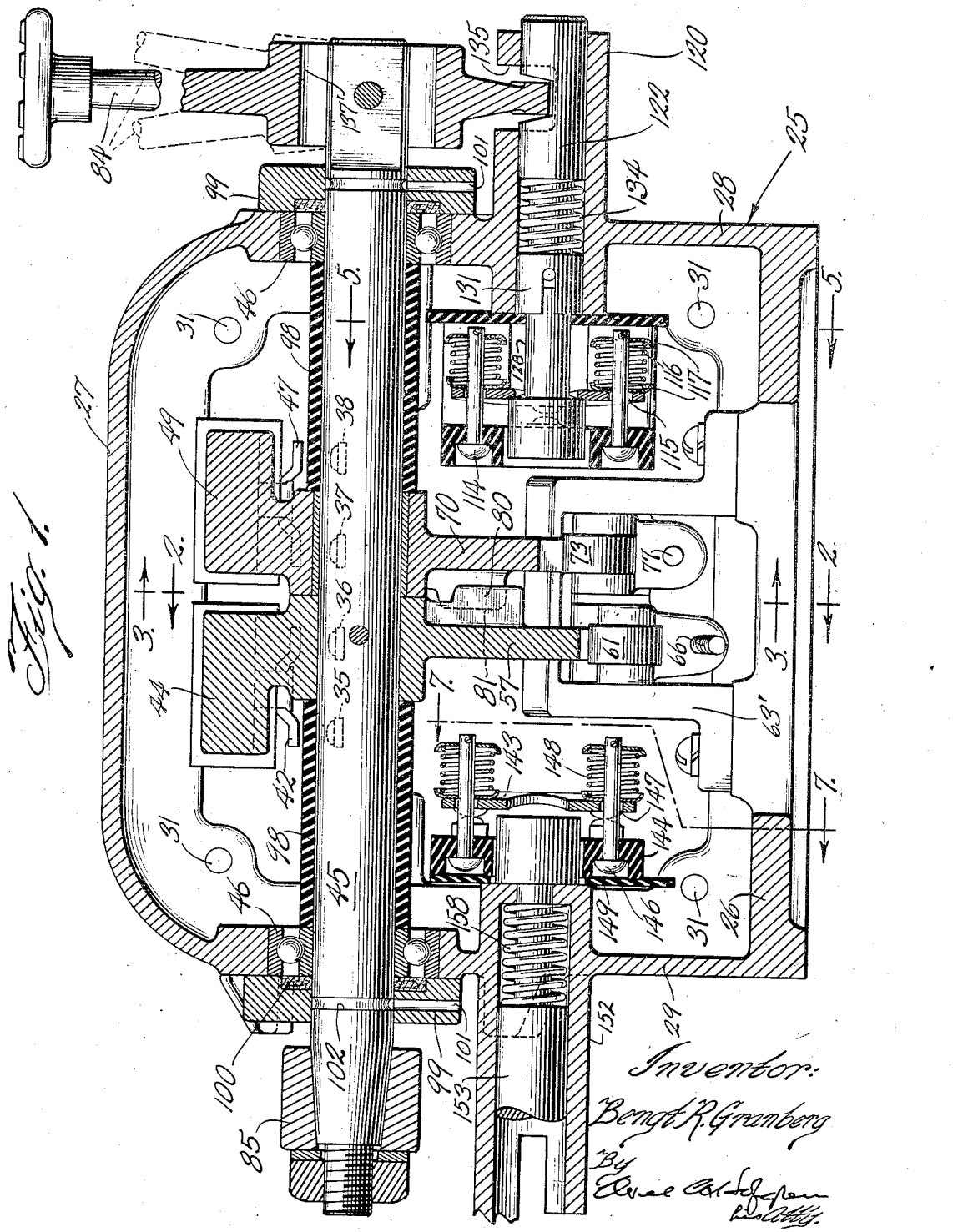
Fig. 1 is a vertical longitudinal sectional view of a unitary controller embodying the features of the invention.

Though the invention is susceptible of various modifications and alternative constructions, it is here shown and will be described hereinafter in a preferred embodiment, but it is not intended that the invention is thereby to be limited to the specific form shown, but it is intended to cover all modifications and alternative constructions falling within the spirit and scope of the invention as defined by the appended claims.

While a control mechanism embodying the features of the invention may be arranged to form a variety of circuits for a variety of control purposes, it is, for purposes of disclosure, here shown and will hereinafter be described as applied to the control of a machine tool such as a milling machine, a lathe, or the like. Such a machine tool customarily has a rotatable spindle and a carriage reciprocable relative to the spindle, with the spindle or the carriage constituting either a work support or a tool support. As is well known to those skilled in the art, the carriage is usually reciprocated through a cycle including various combinations of rapid traverse and feed movements in a forward and a return direction. The spindle and the carriage may be driven in a variety of ways, but, for purposes of disclosure, it will be assumed that the spindle is driven directly (see Fig. 11) by a reversible electric motor SM which is started and stopped to start and stop the spindle and reversed to reverse the direction of rotation of the spindle. Such starting, stopping and reversal of the spindle motor is controlled in well known manner by a spindle forward contactor SFC and a spindle reverse contactor SRC interposed between the spindle motor and line wires L1, L2 and L3. Permissibly there is connected in parallel with the spindle motor a coolant motor CM for driving a pump supplying coolant. This motor usually is further controlled by a switch 15 located at a control or push button panel or station. The spindle contactors are normally electrically actuated by means of a coil, and accordingly a spindle forward contactor coil SFCC and a spindle reverse contactor coil SRCC are here shown forming a part of a control circuit.

Similarly, the carriage may be driven by a reversible electric feed motor FM which may be started and stopped to start and stop the carriage and reversed to reverse the direction of movement of the carriage. Such a motor normally is connected to obtain a feed movement of the carriage, while a traverse movement of the carriage is obtained by the excitation of a second electric motor herein designated TM. The traverse motor TM may be connected to the drive for the carriage by means of a clutch or may be connected by means of a planetary gear system such as disclosed in a pending application Serial No. 66,463, filed February 29, 1936, jointly, by Bengt Granberg and John B. Sinderson. The feed motor and the traverse motor, which herein also is a reversible motor, are here shown connected in parallel and are primarily controlled as to starting and stopping and direction of rotation by means of a feed left contactor FLC and a feed right contactor FRC interposed in well known manner between the motors and the line wires L1, L2 and L3. The traverse motor is further and independently controlled as to starting and stopping by means of a traverse contactor TC which functions to interrupt the circuit to the motor for the purpose of obtaining a feed rate of movement of the carriage and for completing the circuit to the traverse motor for obtaining a rapid traverse rate of movement of the carriage. Customarily a solenoid brake is provided for holding a portion of the planetary gearing against rotation when the traverse motor is deenergized and accordingly the energizing solenoid 17 of the brake is connected in parallel with the traverse motor so as to be energized, and to be deenergized and permit the brake to be applied when the motor is deenergized. The left and right contactors for the feed and traverse motors are actuated electrically by means of a feed left contactor coil FLCC and a feed right contactor coil FRCC, respectively. The contactor TC likewise is controlled by a traverse contactor coil TCC, all connected in the control circuit.

Connected in the control circuit in addition to the actuating coils for the various contactors above described is an actuating coil MCC for a master contactor having three normally open switches MC1, MC2 and MC3 and a normally closed switch MC4 connected in various portions of the control circuit and for purposes which will be described later. The control circuit, though having additional governing means, is primarily under the control of a unitary controller having combined manual and automatic actuation and constituting the principal feature of the control mechanism. This unitary controller, as shown diagrammatically in Fig. 11 and in actual construction in Figs. 1 to 10, comprises a first control means including a plurality of switches herein associated with the feed left and right contactor coils and the traverse contactor coil, thereby constituting a rate and direction control; a second control means including a plurality of switches herein associated with the master contactor coil and thereby constituting a start and stop control; and a third control means including a plurality of switches herein adapted to be automatically actuated and also associated with the master contactor coil and thereby constituting a limit control.

Referring now more particularly to Figs. 1 to 10, it will be seen that the unitary controller is so constructed that the rate and direction control, the start and stop control, and the limit control may all be housed within a small compact casing generally designated 25, having a base 26, a top 27 and forward and rear end walls 28 and 29, respectively, formed as a single casting. The side walls of the casing (see Figs. 2 and 3) are formed by plates 30 removably secured by bolts 31. Preferably gaskets 32 are interposed between the plates and the casting in order to prevent, as much as possible, the entry of moisture and foreign material.

The rate and direction control herein is both manually and automatically operable and, moreover, is operable independently of the start and stop control and the limit control, and serves to condition the control circuit preparatory to initiation of operation of the machine tool. As previously stated, the rate and direction control comprises a plurality of switches associated with the feed left and right contactor coils and the traverse contactor coil. Herein the switches are four in number, as best seen in Figs. 1, 2, 4 and 11, each consisting of two stationary contacts and a movable contact adapted to bridge the two stationary contacts. Four stationary contacts 35, 36, and 37, 38 are mounted in spaced relation on a bar 39 of insulating material disposed longitudinally of the casing on one side thereof by being bolted to lugs 40. An additional four stationary contacts 35', 36' and 37', 38' are similarly mounted in spaced relation on a bar 39' of insulating material disposed in a position similar to the bar 39 but on the opposite side of the casing.

A movable contact 42 adapted to cooperate with the stationary contacts 35, 36, and a movable contact 43 adapted to cooperate with the stationary contacts 35', 36', are mounted on opposite sides of a T-shaped bracket 44 pinned to an oscillatable shaft 45 extending longitudinally of the casing and journaled in the end walls of the casing in ball bearings 46. As best seen in Figs. 2 and 4, each of the movable contacts is yieldably mounted. Similarly a movable contact 47 and a movable contact 48 are mounted on opposite sides of a T-shaped bracket 49 which is loosely mounted upon the shaft 45. The contacts 47 and 48 are adapted to cooperate respectively with the stationary contacts 37, 38 and 37', 38'. Each of the movable contacts 42, 43, 47 and 48 is yieldably mounted on its respective bracket 44 or 49. To that end a block 50 of insulating material is secured as by bolts 51 to each side of the brackets 44 and 49. Secured to each block (Fig. 4) by a rivet 50' is a channel member 52 within which a movable contact is supported. A compression spring 53 is interposed between the movable contact and the portion of the channel member adjacent the block tending to urge the movable contact outwardly away from the block. One end of the spring 53 encircles the head of the rivet 50', while the other end encircles a raised nub 54 on the back of the contact, whereby the spring is held against slipping out of place.

The bracket 44 has three positions, namely, a neutral position which is that shown in Fig. 2 and in which both movable contacts 42 and 43 are disengaged from the stationary contacts, and an extreme position on either side of neutral in which one of the switches is closed by engagement of a movable contact with the stationary contacts while the other switch remains open, depending upon which extreme position the bracket is swung to. If the bracket 44 is swung to the right, that is clockwise as viewed in Fig. 2, contact 42 engages and bridges contacts 35, 36 to close the switch formed thereby, while contact 43 is disengaged. If the bracket 44 is swung to the left or counter-clockwise, as viewed in Fig. 2, contact 43 engages and bridges contacts 35', 36' to close the switch formed thereby, while the switch formed by the movable contact 42 is open.

In order that the bracket 44 may be retained yieldably in any one of its three positions, it is formed with a depending star wheel portion 57 having an intermediate or neutral notch 58, a notch 59 to the right side of notch 58, and a notch 60 to the left side of notch 58. Adapted to cooperate with the notches is a roller 61 carried on the end of one arm of a crank 62 pivoted on a shaft 63 extending longitudinally of the casing and journalled in a bracket 63' bolted to the base of the casing on the right side thereof. The crank 62 is swung in a direction urging the roller 61 into engagement with the notches in the star wheel portion 57 by means of a tension spring 64 secured at one end to a plug 65 fixed in the base 26 and adjustably secured at its other end to the crank 62 by means of a bolt 66.

The bracket 49 (Fig. 3) has but two positions, namely, a right position and a left position. With the bracket in its left position, as shown in Fig. 3, movable contact 47 engages and bridges contacts 37, 38, while movable contact 48 is disengaged from the contacts 37', 38'. When the bracket 49 is swung to its right position, just the reverse is true with contact 48 engaging its cooperating stationary contacts and contact 47 disengaged from its cooperating contacts. Like bracket 44, bracket 49 is formed with a depending star wheel portion 70 formed with two notches 71 and 72. Mounted to cooperate with the notches is a roller 73 carried on the end of one arm of a crank 74 journaled on the shaft 63 adjacent to and parallel with the crank 62. The crank 74 is swung in a direction to engage roller 73 with the notches 71 and 72 by means of a tension spring 75 secured at one end to a plug 76 fixed in the base 26 and at the other end adjustably secured to the crank by means of a bolt 77.

As previously stated, the bracket 44 is pinned to the shaft 45, while the bracket 49 is loose upon the shaft. In order to obtain a unique movement of the brackets 44 and 49 and the switches controlled thereby, which particularly adapts the controller for use with machine tools, the bracket 49 is actuated by the bracket 44 through a lost motion connection. This lost motion connection is of such a nature that when the bracket 44 is swung to either extreme position the bracket 49 also is swung in the same direction, but when the bracket 44 is merely returned from either extreme position to its neutral position no movement is imparted to the bracket 49. The lost motion connection comprises a lug 80 formed centrally of the star wheel portion 57 of the bracket 44 and extending axially to project between spaced lugs 81 formed at the side edges of the star wheel portion 70 of the bracket 49 and extending axially so as to overlap the lug 80. It will be seen, with the foregoing arrangement, that upon rotation of the bracket 44 to its extreme position in a clockwise direction as viewed in Fig. 2 both contact 42 and contact 47 will engage their respective stationary contacts and that bracket 44 may then be rotated in a counter-clockwise direction to its neutral position thereby disengaging movable contact 42 and stationary contacts 35, 36, while contact 47 remains in engagement with contacts 37, 38. Similarly upon rotation of the bracket 44 to its extreme in a counter-clockwise direction, as viewed in Fig. 2, contact 47 would first be disengaged and then all of the contacts 35', 36' and 37', 38' would be engaged. Upon subsequent rotation of the bracket 44 to its neutral position, movable contact 43 will be disengaged while contact 48 remains engaged.

Means is provided whereby the shaft 45 may be oscillated both manually and automatically for the purpose of closing or opening the switches controlled by the brackets 44 and 49. Accordingly the shaft 45 is made to project through each end wall of the casing and at its forward end the shaft carries a handle 84 whereby it may be manually oscillated in a clockwise or a counter-clockwise direction. At the end projecting through the rear wall of the casing 25 (Figs. 1 and 10) the shaft has keyed thereto an arm 85 carrying a follower 86, for dog actuation, mounted in a lateral cylindrical extension 87 of the arm 85. The follower 86 is so constructed and mounted in the arm 85 that upon engagement with one type of dog it is cammed in a manner to oscillate the shaft 45, while upon engagement with a different type of dog it is cammed inwardly of the extension 87 permitting the dog to pass without changing the position of the shaft 45. To that end the follower 86 is formed as the projecting end of a hollow piston 88 rotatably and slidably mounted within the extension 87 in roller bearings 89. The piston 88 is urged outwardly of the extension 87 by means of a compression spring 90 which at one end abuts an annular flange 91 in the piston 88 and at the other end abuts a plunger 92 having a stem 93 extending through the flange 91 and held against withdrawal by a washer 94 and pin 95. The plunger 92 abuts a plate 96 bolted to the arm 85 over the bore of the cylindrical extension 87. Piston 88 is held against loss through the other end of the extension 87 by means of a radial flange 97 on the piston which abuts the roller bearings 89.

To retain the bracket 69 in its position abutting the bracket 44 and further to insulate the controller, there is interposed between each of the brackets and the roller bearings 46 a sleeve 98 of insulating material. A cap 99 is secured over the aperture in each end wall of the casing 26 in which the bearings 46 are mounted, and is provided with a recess for receiving an annular packing 100 and with a drilled hole 101 registering with an annular groove 102 formed in the shaft to keep water from creeping in.

The start and stop control means is designed to have an operation independent from the rate and direction control yet is so constructed that it may readily be incorporated in the casing 25 and may be mounted so that it may be actuated by the handle 84 through a movement of the handle separate and distinct from the movement actuating the rate and direction control. To that end the start and stop control comprises two switches formed by three stationary contacts 105, 106 and 107 (Figs. 1, 5 to 6B and 11) and a movable contact 108 in the form of a tiltable plate provided with contact points 109 positioned to cooperate with the stationary contacts. The stationary contacts are mounted in triangular relationship on a block 110 of insulating material which is secured by means of bolts 111 passing through the front wall 28 of the casing and threaded into the block 110. The block is spaced from the end wall of the casing by spools 112 of insulating material and a plate 113 of insulating material which, with the block 110, form a frame for the switch means. The movable contact plate 108 has the contact points 109 disposed in a triangular relationship to cooperate with the triangularly disposed contacts on the block 110 and is mounted for relative movement with respect to the block on two pins 114 projecting from the block in a vertical plane and passing through apertures 115 in the plate 108. These apertures are large enough to permit tilting of the plate with respect to the block 110 as well as sliding movement relative to the block. The plate is urged toward engagement with the contacts on the block 110 by two coil springs 116, each encircling one of the pins and resting at its ends in flanged washers 117. One of the washers abuts the plate 108, while the other washer is retained on the pin 114 by a cotter pin 118.

Means is provided herein for normally retaining the plate 108 in its neutral position shown in Fig. 6, in which the plate is in engagement with two of the stationary contacts to close one of the switches, but is disengaged from the other stationary contact to open one of the switches and for shifting the plate to one side of neutral, as shown in Fig. 6A, in which it engages all of the contacts, or to the opposite side of neutral, as shown in Fig. 6B, in which it is disengaged from all of the contacts. To that end, the end wall 28 of the casing 25 is formed with a tubular extension 120 vertically below the shaft 45 having a bore 121 in which is slidable a plunger 122. This plunger has two portions 123 and 124 of successively reduced diameter and a still further reduced and threaded end portion 125 which carries a head 126 of insulating material, further secured by means of a pin 127. The portion 124 is surrounded by a sleeve 128 of insulating material and passes freely through a large aperture 129 in the plate 108 and also through an aperture 130 in the plate 113. Slidably mounted in the inner end of the bore 121 is a sleeve 131 which in turn receives slidably within it the portion 123 of the plunger 122 and the insulating sleeve 128. The sleeve 131 is formed with diametrically opposed slots 132 for the reception of the ends of a pin 133 carried by the plunger 122. Interposed between the sleeve 131 and the shoulder formed by the reduced portion 123 of the plunger is a compression spring 134 whose strength is greater than the combined strength of the springs 116. The sleeve 131 is retained against movement outwardly of the bore 124 under the influence of the spring 134 by the plate 113, while the plunger 122 is restrained from outward movement beyond the point at which the pin 133 engages the ends of the slots 132 because the spring is then acting merely on the equivalent of two shoulders on the plunger. With this arrangement, it will be seen that the plunger 122 normally assumes the position shown in Fig. 6 in which position the head 126 engages the plate 108 and tilts the same so as to disengage the plate from the contact 107, but permits the plate to remain in engagement with the contacts 105 and 106. The plate may be moved to engage all the contacts and thereby close both switches by moving the plunger 122 inwardly against the action of the spring 134, and may be moved to disengage all of the contacts by moving the plunger, the sleeve 131 and the plate 108 bodily outwardly against the action of the springs 116.

In order that the single control handle 84 may be employed to actuate both the rate and direction control as well as the start and stop control in all positions of the handle and by independent and distinct movements, the tubular extension 120 is formed with a wide slot 135 and the plunger 122 is formed with a groove 136 which is disposed centrally of the slot 135 when the plunger is in its neutral or intermediate position. The handle 84, as best seen in Figs. 1 and 9, is formed with a segment 137, projecting into the groove 136 of the plunger 122, and an oblong aperture 137' for receiving the projecting end of the shaft 45 which preferably is flattened. The handle is pivotally mounted on the shaft for movement in a plane longitudinal of the controller by a pin 138. With this mounting of the handle 84 and the construction of the start and stop control, it is apparent that the handle has a movement for the actuation of the rate and direction control which is independent and distinct from its movement for the stop and start control. Furthermore it is apparent that the start and stop control may be actuated directly and immediately regardless of the position of the handle 84 in its actuation of the rate and direction control, for the segment 137 is wide enough to engage the plunger in all positions of the handle. To close all of the switches of the start and stop control, the handle 84 is pulled forwardly, while to open all the switches the handle 84 is pushed rearwardly.

Housed within the casing 25 at the opposite end from the start and stop control but in the same relative position is the limit control (see Figs. 1, 7 to 8B and 11). Like the start and stop control, the limit control comprises two switches formed by three stationary contacts 140, 141 and 142 and a movable contact 143 in the form of a shiftable and tiltable plate. The stationary contacts are again mounted in triangular relationship on a block 144 of insulating material which is secured by bolts 145 to the rear end wall 29 of the casing. The movable contact plate 143 is again mounted for movement relative to the block 144 on a pair of pins 146 secured in a vertical plane in the block 144 and projecting through apertures 147 in the plate 143. The plate is urged toward engagement with the stationary contacts by means of compression springs 148 mounted as described in connection with the start and stop control. To insulate the heads of the pins 146 from the casing, a sheet 149 of insulating material is interposed between the block 144 and the wall of the casing.

The plate 143 has three positions, with its normal position that shown in Fig. 8, in which it is in engagement with all of the stationary contacts. The first position of the plate away from normal is that shown in Fig. 8A in which the plate has been tilted so as to be disengaged from the stationary contact 140, but remains in engagement with contacts 141 and 142. The third position of the plate 143 is that shown in Fig. 8B in which it is bodily shifted out of engagement with all of the stationary contacts.

Whereas the start and stop control was actuated only manually, the limit control is intended to be actuated only automatically. To that end the rear end wall 29 of the casing is formed with a tubular extension 152 in which is reciprocable a plunger 153 carrying a cam follower in the form of a roller 154 at its outer end. At its inner end the plunger has a reduced portion which is threaded into a head 155 of insulating material which is further secured on the plunger by means of a pin 156. The head 155, which is normally disposed partly in an aperture 157 in the block 144, upon inward movement of the plunger 153 engages the plate 143 to move it to its successive positions. The plunger 153 is urged outwardly of the tubular extension 152 by means of a compression spring 158 which encircles a reduced portion of the plunger and at one end abuts a shoulder 159 formed on the plunger by the reduced portion, and at the other end abuts a shoulder 160 formed by an inwardly projecting flange in the tubular extension 152.

It is believed apparent from the foregoing that I have perfected a controller of unique construction and one which in a compact unit embodies a large number of switches adapted for operation independently or jointly in a variety of ways so that the controller may be adapted for a variety of circuits and provide extreme flexibility of control. As previously stated, the controller is particularly well adapted for use in a control circuit for machine tools, and a novel control circuit for that purpose including my controller will now be described.

Such a control circuit, as previously stated, includes the spindle forward and reverse contactor coils, the feed right and left contactor coils, the traverse contactor coil, and a master contactor coil, and it is by the energization or deenergization of these coils that the various contactors are closed or opened to produce the desired operation of the motors. The control circuit as connected herein functions to permit starting of the carriage either to the right or to the left and at either feed or traverse speed, such selection of rate and direction of movement being determined, as previously stated, by the swinging of the handle 84 to the right or the left, respectively. Accordingly, the contacts 37 and 37' are connected by branch leads 165 and 166 to a common lead 167 which is connected to one stationary terminal 169 of a normally closed push button switch 170, the other stationary terminal 171 of which is connected to the line wire L1. Interposed in the lead 167 are two switches MC1 and MC2 of the master contactor. Stationary contact 38 is connected by a lead 172 to one end of the feed right contactor coil FRCC, the other end of which is connected to the line wire L3. Correspondingly, the stationary contact 38' is connected by a lead 173 to one end of the feed left contactor coil FLCC, the other end of which is connected to the line wire L3. Stationary contacts 35 and 35' are connected by a common lead 174 and branch leads to the lead 167 behind the switch MC2, while contacts 36 and 36' are connected by a common lead 175 and branch leads to one end of the traverse contactor coil TCC, the other end of which is connected to the line wire L3.

It will be seen that the switch including the movable contact 42 and the switch including the movable contact 43 are connected in parallel so that closure of either switch will energize the traverse contactor coil. The switch including movable contact 47 and the switch including movable contact 48, however, control respectively the feed right and the feed left contactor coils. Thus by swinging the handle 84 to the extreme right or left either the switch including contact 47 will be closed and the switch including contact 48 will be open, or vice versa, so as to complete a circuit to either the feed right or the feed left contactor coil and thereby determine the direction of rotation of the feed motor as well as of the traverse motor. If the handle 84 is retained in its extreme position to the right or the left, a circuit is also completed to the traverse contactor coil, thereby closing the contact TC to cause the traverse motor to operate and drive the carriage at a rapid traverse rate. However, should the handle 84 be returned to neutral after being swung to the extreme either to the right or left, the switches controlling the traverse contactor coil will be open while the switch controlling the feed contactor coil will remain closed and thereby cause the feed motor only to operate for driving the carriage at a feed rate.

The switches of the start and stop control in conjunction with the switches of the limit control exercise control over the master contactor coil MCC. Accordingly, contact 105 is connected by a lead 176 to the terminal 169 of the push button switch 170. Contact 106, which is connected to the contact 105 by the movable contact 108, when in its neutral position, is connected by a lead 177 to stationary contact 140 of the limit control, the lead 177 moreover having interposed therein switch MC3 of the master contactor. Contact 107 of the start and stop control, which normally is out of engagement with the movable contact 108, is connected by a lead 178 with the contact 142 of the limit control. The remaining contact 141 of the limit control is connected by a lead 179 to one end of the master contactor coil which has its other end connected to the line wire L3. It will be remembered that the movable contact 143 of the limit control in its normal position is in engagement with all of the stationary contacts 140, 141 and 142.

The portion of the control circuit governing the spindle motor is so arranged that the spindle is rotated whenever the carriage is driven at a feed rate regardless of the direction of movement, but is not rotated during a traverse rate of movement of the carriage. Moreover, selector means is provided whereby the spindle may be caused to rotate in a forward direction regardless of the direction of carriage movement, in a reverse direction regardless of the direction of carriage movement, or in a forward or reverse direction depending upon the direction of carriage movement. The spindle may also be rotated independently of the operation of the feed and traverse motors. Accordingly, one end of each the spindle forward contact coil SFCC and the spindle reverse contactor coil SRCC are connected through a common lead 180 to the line wire L3. Interposed in the lead 180 is a normally closed switch TC4 which is a part of the traverse contactor TC. The other end of the spindle forward contactor coil is connected by a lead 181 and thence through three branch circuits 182, 183 and 184 to the lead 167. The first of these, namely 182, includes a push button switch 185 which is normally open and which may be manually closed to complete a circuit to the spindle forward contactor coil for the purpose of rotating the spindle independently of the feed and traverse motors. In parallel with the push button switch 185 is a holding switch SCF4 actuated by the spindle forward contactor, and in series with the holding switch SFC4 is a normally closed switch MC4 forming a part of the master contactor. The second circuit 183 includes a stationary terminal 183' and blade 187 of a spindle selector switch. The third branch circuit 184 includes in series relationship a terminal 184' of blade 188 of the spindle selector switch and a switch FLC4 constituting a part of the feed left contactor FLC. The circuits 183 and 184 are connected to the lead 167 intermediate the switches MC1 and MC2 of the master contactor, whereas the circuit 182 is connected between the push button switch 170 and the first switch MC1.

The remaining end of the spindle reverse contactor coil SRCC is connected by a lead 190 to a contact 191 adapted to be engaged by the blade 188 and includes in series relationship a switch FRC4 forming a part of the feed right contactor. Switches FLC4 and FRC4 are normally open and are closed when the feed contactor with which they are associated is closed. Thus it will be seen that with blade 187 swung to complete circuit 183 and with the blade 188 open, the spindle will always be rotated in a forward direction regardless of the direction of table movement. With the blade 187 swung to close on contact 184', and with blade 188 swung to close on contact 191, the spindle will be rotated in a forward or reverse direction depending upon which of the switches FLC4 and FRC4 is closed, this in turn depending upon the direction of carriage movement. With only blade 188 closed on contact 191, the spindle will be rotated in the reverse direction regardless of the direction of carriage movement.

Connected in each line wire L1 and L3 is a fuse 193 and also connected in series relationship in the line wire L1 are two normally closed switches 194 controlled by the overload relays OLR connected in the leads to the spindle motor and the feed and traverse motor so that the entire operation of the machine will be arrested should either overload relay be actuated.

The operation of the control mechanism with the unitary controller connected as described is briefly as follows: The attendant would first adjust the blades 187 and 188 to obtain the desired operation of the spindle as previously described. If it be assumed that it is desirable to have the spindle rotate in a direction depending upon the direction of movement of the carriage, blade 187 would be swung to close upon contact 184' and blade 188 would be swung to close upon contact 191. The attendant is now ready to initiate operation of the machine and this is done simply by manipulation of the single control handle 84. At the will of the attendant the machine may be started with carriage movement either to the right or to the left, and at either feed or traverse speed. Customarily the carriage is started at a traverse rate to bring the work up to the tool and, if it be assumed that the carriage is to be started toward the right and at a traverse rate, the handle 84 is swung to the right to its extreme position. This would establish the circuit to the feed right contactor coil FRCC through stationary contacts 37, 38 and movable contact 47 and would likewise establish a circuit to the traverse contactor coil TCC through stationary contacts 35, 36 and the movable contact 42. No energization of the coils takes place, however, because the normally open switches MC1 and MC2 of the master contactor are still open.

To effect closure of the switches MC1 and MC2 and thereby initiate operation of the machine, the attendant pulls back on the handle 84, thereby moving the plunger 122 inwardly to permit movable contact 108 to close upon contact 107. This would complete a starting circuit from line wire L1 through lead 176, contacts 105, 108 and 107, lead 178 to contact 142 of the limit control, thence through movable contact 143, contact 141 and lead 179 to the master contactor coil. Energization of the master contactor coil MCC results in the actuation of the contactor with the resultant closure of the normally open switches MC1, MC2 and MC3 and the opening of the normally closed switch MC4. Closure of the switch MC3 results in the completion of a holding circuit for the master contactor coil through the contacts 105, 108 and 106, lead 177 to the contact 140 of the limit control, thence through contacts 143 and 141 and the lead 179. Handle 84 may now be released. Closure of the switches MC1 and MC2 completes the previously conditioned circuits to the traverse contactor coil and to the feed right contactor coil, thereby effecting initiation of operation of the feed and traverse motors. With the traverse contactor coil energized, the switch TC4 of the traverse contactor is opened thus preventing the operation of the spindle during traverse movement of the carriage.

To obtain a feed movement toward the right, the handle 84 may be returned to its neutral position manually, or the shaft 45 of the controller may be rocked to neutral position by engagement of a suitable dog on the carriage with the follower 86. Due to the lost motion between the brackets 44 and 49, this would break the circuit through contacts 35, 36, thereby deenergizing the traverse contactor coil but would not interrupt the circuit to the feed right contactor coil. As a result, the carriage would continue to travel to the right at a feed rate and the switch TC4 would close, thereby completing a circuit through the spindle reverse contactor because the switch FRC4 has been closed by closure of the feed right contactor. By the provision of suitable dogs on the carriage positioned to engage the follower 86 the rate and direction control could be oscillated to drive the carriage through various cycles of feed and traverse in both a right and a left direction. For stopping the carriage, a dog would be provided on the carriage adapted at a predetermined time to engage the follower 154 and shift the plunger 153 to shift the movable contact 143 to its first position away from normal. In this position the movable contact 143 is disengaged from the contact 140, thereby interrupting the holding circuit including lead 177 and stopping the carriage, but contacts 141 and 142 are still bridged so that the starting circuit may still be completed through the contact 107 and lead 178. Thus, by actuation of the handle 84 permitting contact 108 to engage contact 107, the machine may again be started. If it is started in the correct direction by the attendant, the follower 154 would be permitted to return to its normal position, thereby reestablishing the holding circuit 177 and permitting the handle 84 to be released. However, should the attendant accidentally start the machine in the wrong direction so that the carriage would travel beyond its normal path, a second dog would engage the follower 154 and shift the contact 143 to its second position away from normal, thereby opening all the switches of the limit control. Under those circumstances, closure of the switches of the start and stop control would be ineffective and the machine could not again be operated until the attendant first manually returned the carriage to its normal path.

To stop the machine at any time, the attendant simply pushes forward on the handle 84, thereby shifting plunger 122 to disengage contact 108 from all of the stationary contacts of the start and stop control.

It will be seen from the foregoing that I have perfected a novel control mechanism which is unusually flexible in control and simple in operation. This mechanism, moreover, includes a unitary controller which contains in a very compact yet simple construction a large number of switches which are variously operable so that the controller may be incorporated in a variety of circuits and provide a variety of controls. The controller is particularly well adapted for use with machine tools in that it has rate and direction control which is both automatically and manually operable, a start and stop control which is only manually operable, and a limit control which is only automatically operable. The entire manual control is under a single handle, yet the movements of the handle for each control are independent from the movements for the other control and may be made at any time without affecting the other control or without requiring the controller to be shifted through a plurality of positions.

I claim as my invention:

1. A controller for an electrical control circuit comprising, in combination, a casing, a first pair of switches, oscillatable means for actuating said switches including a rotatably mounted shaft having one end projecting outwardly of the casing, a second pair of switches disposed within the casing, a reciprocable actuating means for said switches having a portion extending outwardly of the casing adjacent the outward projection of the shaft, a single control handle fixed on the projecting end of the shaft against rotation relative thereto for actuating the first pair of switches by movement of the handle in a plane transverse to the shaft, said handle having a neutral and an extreme position on either side of neutral in the plane transverse to the shaft, means for yieldably retaining said handle in any one of its three positions, said handle being pivotally mounted on the end of the shaft for movement in a plane through the shaft and engaging said reciprocable actuating means for actuating the second pair of switches, said handle having in its pivotal movement a neutral position corresponding with the neutral position in its transverse plane of movement and an extreme position on either side of neutral in a plane through the shaft, the reciprocable actuating means including means tending to return said handle to its neutral position in a plane through the shaft.

2. A controller for an electrical control circuit comprising, in combination, an elongated casing, a plurality of contacts stationarily mounted within the casing along each side thereof, a shaft extending longitudinally of the casing and journaled therein for oscillatory movement, a first bracket fixed on said shaft to oscillate therewith, a contact carried on each side of said bracket for cooperation with pairs of stationary contacts on the corresponding side of the housing, said bracket having three positions including a neutral position in which the contacts on the brackets are both disengaged from the stationary contacts, and an extreme position on either side of neutral in which one of the contacts on the bracket engages and connects together a pair of fixed contacts while the other contact on the bracket is disengaged from the other pair of fixed contacts, means for oscillating said shaft, detent means for determining the bracket positions, a second bracket loosely mounted on said shaft and carrying a contact on each side for cooperation with pairs of stationary contacts on the corresponding side of the casing, said second bracket having only two positions, in each of which the contact on one side of the bracket engages and connects together a pair of stationary contacts on the same side of the casing while the other contact is disengaged from the other pair of stationary contacts, detent means for yieldably holding said second bracket in either of said two positions, and a lost motion connection from the shaft to said second bracket operable to cause the second bracket to be swung to one position or the other when the first bracket is swung to a corresponding extreme position but permitting swinging of the first bracket to neutral position without actuating the second bracket.

3. A controller for an electrical control circuit comprising, in combination, a first and a second set of stationary contacts, a first and a second movable contact respectively cooperable with said first and second sets of stationary contacts alternatively to connect the contacts of one set or the other together, means for supporting said movable contacts having a neutral position in which both movable contacts are disengaged from the respective stationary contacts, a first extreme position on one side of neutral in which the first movable contact engages the first set of stationary contacts and in which the second movable contact is disengaged from the second set of stationary contacts, and a second extreme position on the other side of neutral in which the second movable contact engages and the first movable contact is disengaged, and a third and a fourth set of stationary contacts, a third and a fourth movable contact, a second member supporting said third and fourth movable contacts for cooperation respectively with the third and fourth sets of stationary contacts alternatively to connect the contacts of one set or the other together, said second member having two positions, in each of which one movable contact cooperates with its stationary contacts while the other movable contact is disengaged from its stationary contacts, and a lost motion connection between said members rendering the first member operable to shift the second member when the first is moved to either extreme position but permitting movement of the first member to neutral position without shifting the second member.

4. A unitary controller for an electrical circuit comprising a casing, a plurality of sets of stationary contacts mounted within the casing along each side thereof, a shaft extending longitudinally of said casing between the contacts and rotatably mounted in said casing, a first bracket fixed on said shaft carrying a contact on each side thereof, said bracket having a neutral and an extreme position on either side of neutral and operable to engage one of its contacts with a set of stationary contacts on the corresponding side while its other contact is disengaged and vice versa as the bracket is swung to one or the other extreme position and operable to support its contacts free from engagement when in neutral position, a second bracket loosely mounted on said shaft and carrying on each side a contact, said bracket having two positions in each of which one of its contacts engages a cooperating set of stationary contacts while the other one of its contacts is disengaged, a lost motion connection between said brackets, a switch device mounted at one end of the casing below said shaft, a plunger for actuating said switch device projecting through the end wall of the casing, and a single handle mounted on one end of said shaft and fixed thereon against rotation relative thereto for oscillating the shaft and pivoted thereon for movement in the plane of the shaft and extending into engagement with said plunger for shifting the plunger to actuate said switch device.

5. In a controller for a control circuit, electrical switch means comprising a frame carrying a plurality of stationary contacts, a movable contact mounted for movement relative to the stationary contacts, spring means urging said movable contact toward engagement with all of the stationary contacts, and actuating means for said movable contact comprising a plunger extending into the frame and loosely through said movable contact and having a head on the end thereof for engagement with the movable contact on the side thereof facing the stationary contacts, a sleeve loosely encircling said plunger exteriorly of the frame and disposed to be limited in its inward movement by abutment with the frame, means on the plunger adapted to cooperate with the sleeve for limiting outward movement of the plunger, and a compression spring interposed between said sleeve and a shoulder formed on the plunger outwardly of the sleeve, said spring being stronger than the spring means urging said movable contact toward engagement with the fixed contacts and said sleeve being proportioned so that when the plunger is unrestrained the compression spring shifts the plunger to a position causing the movable contact to be moved to a neutral position in which it is in engagement with only a portion of the stationary contacts, said spring being compressible to permit inward movement of the plunger freeing the movable contact to engage all of the stationary contacts, and said plunger and sleeve being jointly shiftable to disengage the movable contact from all of the stationary contacts.

BENGT R. GRANBERG.